July 14, 1931.  H. T. SEELEY  1,814,860
AUTOMATIC CONTROL SYSTEM
Filed Nov. 13, 1929
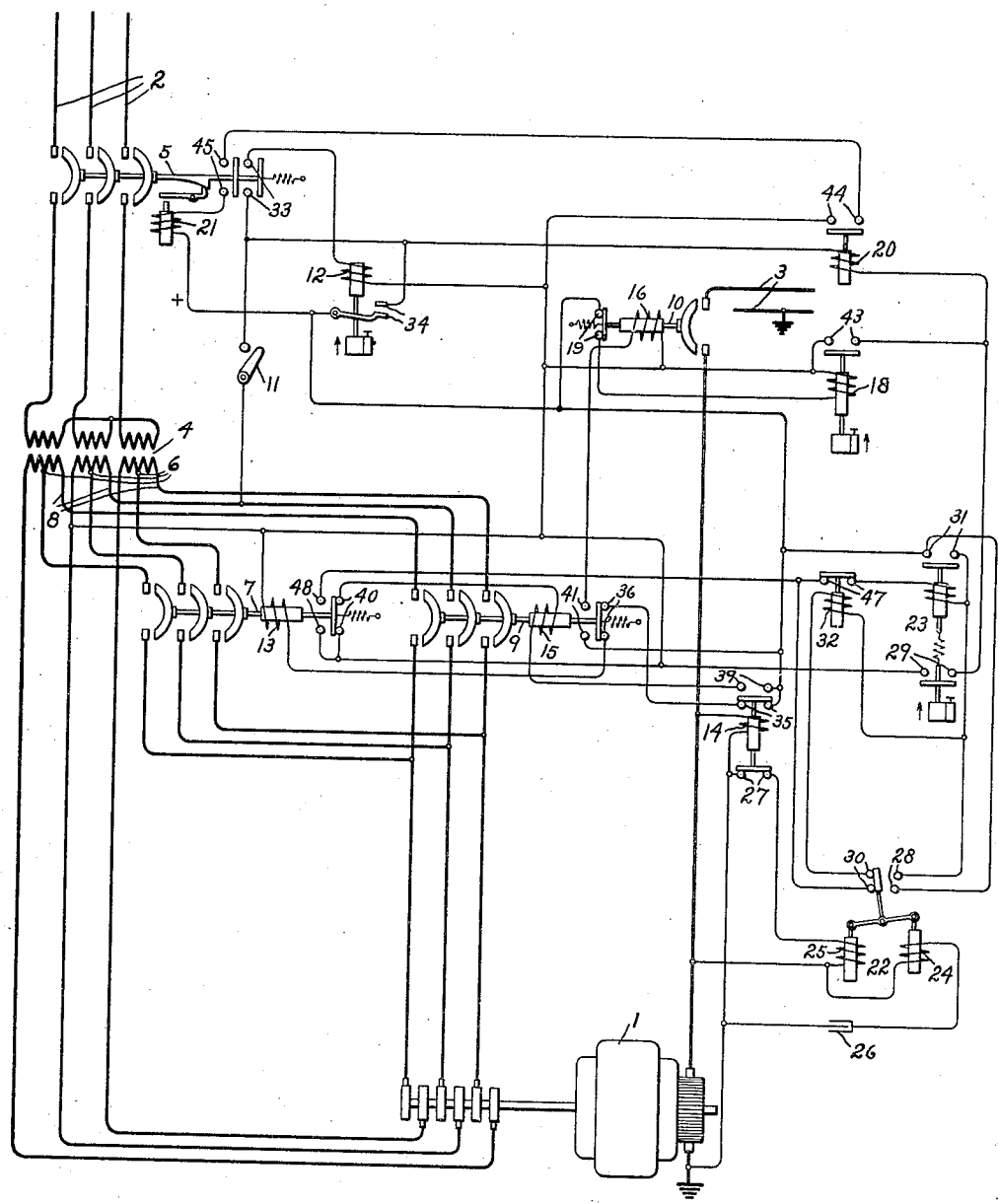
Inventor:
Harold T. Seeley,
by Charles E. Miller
His Attorney.

Patented July 14, 1931

1,814,860

UNITED STATES PATENT OFFICE

HAROLD T. SEELEY, OF YEADON, PENNSYLVANIA, ASSIGNOR TO GENERAL ELECTRIC COMPANY, A CORPORATION OF NEW YORK

AUTOMATIC CONTROL SYSTEM

Application filed November 13, 1929. Serial No. 406,955.

My invention relates to automatic control systems for translating devices, and particularly for devices such as rotary transformers, mercury arc rectifiers, etc., which translate electric energy from a supply circuit to a load circuit, and its object is to provide an improved control arrangement for effecting the disconnection of the translating device from its supply circuit and for preventing its reconnection to the supply circuit if the translating device does not start to operate immediately after it is connected to the supply circuit.

In most automatic control equipments for translating devices, the device is started by first connecting it to the supply circuit and then connecting it to the load circuit after the device has been placed in an operative condition to supply current thereto. Means, also, are usually provided whereby the device is shut down and the automatic equipment is rendered inoperative to effect a subsequent operation of the device, if the device is not connected to the load circuit within a predetermined relatively long time interval after the starting operation is effected. I find, however, that under certain abnormal conditions, such for example as the failure of the device to start, it is desirable not to wait until the expiration of the relatively long time interval before disconnecting the device from the supply circuit and rendering the automatic control means inoperative to effect a subsequent starting of the device. Therefore, in accordance with my present invention, I provide an arrangement whereby the occurrence of a predetermined abnormal condition effects the disconnection of the device from the supply circuit and the rendering of the automatic control equipment inoperative before the expiration of said relatively long time interval.

My invention is particularly adapted for use in connection with automatic control equipments for dynamo electric machines in which it is desirable immediately to disconnect the machine from the supply circuit in case the rotor of the machine fails to rotate when the armature winding of the machine is connected to the supply circuit, and in accordance with my invention I provide an arrangement for accomplishing this result.

When my invention is used to protect a rotary converter against the failure of its rotor to start rotating in response to the armature winding thereof being connected to the supply circuit, I employ, in accordance with the preferred embodiment of my invention, the frequency of the voltage across the direct current brushes of the converter during the starting operation of the converter as the means for effecting the immediate disconnection of the converter from the supply circuit and for rendering the automatic control equipment inoperative to effect a subsequent starting of the converter.

My invention will be better understood from the following description, when taken in connection with the accompanying drawing, and its scope will be pointed out in the appended claims.

Referring to the accompanying drawing, the single figure of which diagrammatically shows an automatic control system for a rotary converter embodying my invention, 1 represents a rotary converter which is adapted to be connected between an alternating current supply circuit 2 and a direct current load circuit 3, one side of which is connected to ground. 4 represents a polyphase transformer the primary winding of which is arranged to be connected to the supply circuit 2 by means of a non-automatic closing circuit breaker 5. The secondary winding of the transformer 4 is provided with the low voltage taps 6 which are adapted to be connected to the armature winding of the rotary converter 1 by means of a suitable switch 7 so that a relatively low alternating current voltage may be impressed upon the armature winding of the converter for starting purposes. The secondary winding of the transformer 4 is also provided with high voltage taps 8 which are adapted to be connected to the armature winding of the converter 1 by means of a switch 9 so that a relatively high voltage may be impressed upon the armature winding for running purposes.

The rotary converter 1 is adapted to be connected to the load circuit 3 by means of a switch 10 which may be of any suitable construction examples of which are well known in the art.

As shown in the drawing the starting of the converter 1 is effected by the closing of a suitable control switch 11 which may be controlled in any suitable manner examples of which are well known in the art. The switch 11 when closed is arranged, when the circuit breaker 5 is closed, to complete a circuit for a master control relay 12. The energization of the master relay 12 effects the successive closing of the starting switch 7, the running switch 9 and the load switch 10. Any suitable control arrangement, examples of which are well known in the art, may be provided for effecting the operation of the switches 7, 9 and 10 in the desired sequence and at the proper time. In the particular arrangement shown in the drawing the energization of the control relay 12 completes a circuit for the closing coil 13 of the starting switch 7. When the direct current voltage of the converter exceeds a predetermined value a direct current relay 14, which is connected across the direct current brushes of the converter 1, effects the opening of the switch 7 and the completion of a circuit for the closing coil 15 of the switch 9. The closing of the switch 9 completes a circuit for the closing coil 16 of the load switch 10 so as to connect the converter to the load circuit. In actual practice, the circuits of the closing coils may be controlled by other suitable devices in a manner well known in the art so that the proper operation thereof is effected at all times. Since these devices are well known and constitute no essential part of my present invention I have omitted them from the disclosure in order to simplify it.

In order to disconnect the converter 1 from the supply circuit 2 in case the converter is not connected to the load circuit 3 within a predetermined time, I provide a time relay 18 which is energized in response to the energization of the master relay 12 and which is deenergized by auxiliary contacts 19 on the circuit breaker 10 when it closes. If the circuit breaker 10 does not effect the deenergization of the time relay 18 within a predetermined time interval after the master relay 12 is energized, the time relay 18 completes an energizing circuit for a control relay 20 which, in turn, completes an energizing circuit for the trip coil 21 of the circuit breaker 5 so that the converter 1 is disconnected from the supply circuit 2. Since the circuit breaker 5 has to be closed before the master relay 12 can be energized it will be seen that the opening of the circuit breaker 5 renders the automatic control equipment for the converter inoperative to effect a restart of the converter until after the circuit breaker 5 has been manually reclosed.

In order to effect the immediate disconnection of the converter 1 from the supply circuit 2 in case the rotor of the converter does not start to rotate immediately after the starting switch 7 is closed, I provide in accordance with my invention a suitable speed responsive arrangement for effecting the energization of the control relay 20 and the trip coil 21 of the circuit breaker 5 if the converter speed does not build up to a predetermined value within a predetermined time. In the particular embodiment of my invention shown in the drawing, the speed responsive arrangement comprises a suitable frequency relay 22 which is arranged to effect the energization of a suitable time relay 23 when the frequency impressed upon the frequency relay is above a predetermined value and the deenergization of the time relay 23 when the frequency impressed upon the frequency relay 22 is below a predetermined value. The time relay 23, when energized for a predetermined short time interval, is arranged to effect the energization of the control relay 20 independently of the time relay 18. The control relay 20, in turn, effects the energization of the trip coil 21 so that the circuit breaker 5 is opened.

As shown in the drawing, the frequency relay 22 is a differential relay comprising two windings 24 and 25 which are arranged to exert opposing torques. The winding 24 and a suitable condenser 26 are permanently connected in series across the brushes of the converter and the winding 25 is arranged to be connected directly across the direct current brushes of the converter 1 by the contacts 27 of the relay 14 when the direct current voltage of the converter is below a predetermined value. The circuit of the windings 24 and 25 are designed in any suitable manner so that when the frequency of the voltage across the direct current brushes of the converters is the same as the frequency of the supply circuit 2 the torque produced by the current through the winding 24 is greater than the torque produced by the current through the winding 25 and so that when the frequency of the voltage across the direct current brushes of the converter is slightly below the normal frequency of the supply circuit 3 the torque produced by the current in the winding 25 is greater than the torque produced by the current in the winding 24. Therefore, at the instant when the starting switch 7 is closed while the converter 1 is at rest, the relay 22 closes its contacts 28 and completes an energizing circuit for the time relay 23. If the rotor of the converter 1 does not start to rotate within a relatively short time, the time relay 23 by closing its contacts 29 completes an energizing circuit for the control relay 20 to effect the opening of the circuit breaker 5. If, however, the rotor of the converter does start to rotate immediately after the starting switch 7 is closed, the frequency of the voltage across the direct current brushes of the converter changes sufficiently to cause the relay 22 to open its contacts 28 and close its contacts 30 before the time relay 23 can close its contacts 29 and effect the energization of the control relay 20. In order to relieve the contacts 28 of the frequency relay 22 of the duty of interrupting the current through the time relay 23, I provide the time relay 23 with the contacts 31 which are arranged, in any suitable manner, so that they are immediately closed after the coil of the relay 23 is energized and complete a holding circuit for the coil of the time relay 23. I also provide a control relay 32 which is arranged to be energized in response to the closing of the contacts 30 of the frequency relay 22 when the contacts 31 of the time relay 23 are closed and which, when energized, effects the opening of the holding circuit for the time relay 23.

The operation of the arrangement shown in the drawings is as follows: When it is desired to place the converter 1 into operation, the circuit breaker 5 is closed in any suitable manner and then the control switch 11 is closed. The closing of the control switch 11 completes a circuit for the master control relay 12 from one side of a suitable source of control current through the control switch 11, auxiliary contacts 33 on the closed circuit breaker 5, the coil of relay 12 to the other side of the source of control current. Relay 12 closes its contacts 34 and completes an energizing circuit for the closing coil 13 of the starting switch 7 so that the armature winding of the converter 1 is connected to the low voltage taps 6 of the transformer 4. The circuit of the closing coil 13 is from one side of the control circuit through the control switch 11, contacts 34 of the master control relay 12, contacts 35 of the relay 14, auxiliary contacts 36 on the running switch 9, closing coil 13 to the other side of the control circuit. The closing of the contacts 34 of the master control relay 12 also completes a circuit for the time relay 18, the circuit of which also includes the control switch 11 and the auxiliary contacts 19 on the circuit breaker 10.

As soon as the converter reaches synchronous speed and the voltage across the direct current brushes of the converter becomes direct current, the relay 14 opens its contacts 35 in the circuit of the closing coil 13 of the starting switch 7 and by closing its contacts 39 it completes the circuit of the closing coil 15 of the running switch 9. The circuit of the closing coil 15 is from one side of the control circuit, through the control switch 11, contacts 34 of the master control relay 12, contacts 39 of the relay 14, closing coil 15 of the running switch 9, auxiliary contacts 40 on the starting switch 7 to the other side of the control circuit. The deenergization of the closing coil 13, opens the starting switch 7 and the energization of the closing coil 15 closes the running switch 9 so that the alternating current running connections of the converter are established. The closing of the auxiliary contacts 41 on the running switch 9 completes, through the contacts 34 of the master relay 12 and the control switch 11, an energizing circuit for the closing coil 16 of the switch 10 so that the direct current brushes of the converter are connected across the load circuit 3.

As soon as the circuit breaker 10 closes, the opening of the auxiliary contact 19 thereof effects the deenergization of the time relay 18. If, for any reason, the circuit breaker 10 remains open for a predetermined time while the master control relay 12 is energized, the time relay 18 closes its contacts 43 and completes an energizing circuit for the control relay 20. This circuit is from one side of the control circuit through the control switch 11, coil of control relay 20, contacts 43 of the time relay 18 to the other side of the control circuit. The control relay 20 by closing its contacts 44 completes a circuit for the trip coil 21 of the circuit breaker 5 so that the circuit breaker 5 opens and disconnects the converter 1 and the transformer 4 from the supply circuit 2. The energizing circuit of the trip coil 21 is from one side of the control circuit through the control switch 11, contacts 34 of the master control relay 12, trip coil 21, auxiliary contacts 45 on the circuit breaker 5, contacts 44 of the control relay 20 to the other side of the control circuit. Since the energizing circuit of the master control relay 12 includes the auxiliary contacts 33 on the circuit breaker 5, it will be seen that the opening of the circuit breaker 5 renders the automatic control equipment inoperative to restart the converter 1 until after the circuit breaker 5 has been reclosed.

At the instant the starting switch 7 is closed while the converter is at rest, the frequency of the voltage across the direct current brushes of the converter is the same as the frequency of the supply circuit 2. Therefore, the frequency relay 22 opens its contacts 30 and closes its contacts 28 so that an energizing circuit is completed for the coil of time relay 23. This energizing circuit is from one side of the control circuit through the control switch 11, contacts 34 of the master control relay 12, contacts 28 of the frequency relay 22, coil of relay 23, contacts 47 of the control relay 32, auxiliary contacts 48 on the starting switch 7 to the other side of the control circuit. As soon as the coil of the time relay 23 is energized, the contacts 31 of the relay 23 are immediately closed so that a holding circuit for the coil of the relay 23 is completed independently of the contacts 28 of the frequency relay 22. Therefore, the coil of the relay 23 remains energized when the frequency relay 22 subsequently opens its contacts 28. The energization of the coil of the time relay 23 also causes the contacts 29 of the relay to start closing but these contacts are arranged in any suitable manner so that they are not closed until after the coil of the relay has been energized a predetermined length of time.

If the rotor of the converter 1 starts to rotate immediately after the starting switch 7 is closed, the frequency of the voltage across the direct current brushes of the converter decreases to a value sufficient to cause the frequency relay 22 to open its contacts 28 and close its contacts 30 before the time relay 23 can close its time delayed contacts 29. The closing of the contacts 30 completes an energizing circuit for the control relay 32 which, by opening its contacts 47, opens the holding circuit of the time relay 23. The energizing circuit of the control relay 32 is from one side of the control circuit through the control switch 11, contacts 34 of the master control relay 12, contacts 31 of the time relay 23, coil of relay 32, contacts 30 of the frequency relay 22, auxiliary contacts 48 on the starting switch 7 to the other side of the control circuit. Therefore, if the rotor of the converter 1 starts to rotate immediately after the starting switch 7 is closed, the coil of the time relay 23 is not energized for a sufficient length of time to allow the relay to close its time delayed contacts 29.

If, however, for any reason the rotor of the converter 1 fails to rotate immediately after the closing of the starting switch 7, the frequency relay 22 maintains its contact 28 closed since the frequency across the direct current brushes of the converter remains the same as the frequency of the supply circuit and, therefore, the time relay 23 has time to close its time delayed contacts 29. The closing of the contacts 29 completes through the control switch 11 an energizing circuit for the control relay 20. The energization of the control relay 20 then effects in the manner above described the opening of the circuit breaker 5 so that the converter 1 is disconnected from the supply circuit and the automatic control equipment is rendered inoperative to effect a restart of the converter 1 until after the circuit breaker 5 has been reclosed.

While I have, in accordance with the patent statutes, shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States, is,—

1. In combination, a supply circuit, a load circuit, a rotary transformer, automatic switching means for effecting the connection of said transformer to said supply circuit to start said transformer and for effecting the subsequent connection of said transformer to said load circuit, and means for rendering said automatic switching means inoperative to effect a subsequent starting of said transformer if the transformer is not connected to said load circuit within a predetermined time interval and before the expiration of said time interval if said transformer fails to reach a certain speed within a certain time after the connection thereof to said supply circuit.

2. In combination, a supply circuit, a dynamo electric machine, automatic switching means for effecting the connection of said machine to said circuit so that a relatively low voltage is impressed upon said machine and for subsequently connecting said machine to said circuit so that a relatively high voltage is impressed upon said machine, and means for rendering said automatic switching means inoperative to effect a subsequent connection of said machine to said circuit if the relatively high voltage is not impressed upon said machine within a predetermined time interval and before the expiration of said predetermined time interval if said machine fails to reach a predetermined speed within a certain time after the relatively low voltage is impressed upon said machine.

3. In combination, a supply circuit, a dynamo electric machine, automatic switching means for controlling the connections of said machine so as to start said machine from rest and place it in its normal running condition, means for rendering said switching means inoperative to effect the subsequent starting of said machine if said switching means fails to establish certain connections within a predetermined time interval, and means for rendering said switching means inoperative to effect the subsequent starting of said machine before the expiration of said predetermined time interval if said machine fails to reach a certain speed within a predetermined time during said predetermined time interval.

4. In combination, a supply circuit, a load circuit, a translating device for translating energy from said supply circuit to said load circuit, automatic switching means for controlling the connections of said device so as to place it in an operative condition to supply current to said load circuit and then connect it thereto, and means for rendering said switching means inoperative to effect the subsequent placing of said device in an operative condition to supply current to said load circuit if said switching means does not effect the connection of said device to said load circuit within a predetermined time interval and before the expiration of said predetermined time interval if said switching means does not effect a predetermined operation of said translating device within a second predetermined time interval.

5. In combination, two electric circuits, a translating device, automatic switching means for effecting the connection of said device to one of said circuits and for effecting the subsequent connection of said device to the other circuit, and means for effecting the disconnection of said device from said one of said circuits and for rendering said switching means inoperative to reconnect said device to said one of said circuits if a predetermined operation of said switching means is not effected within a predetermined time interval and before the expiration of said time interval if a predetermined operative condition of said device fails to occur within a predetermined short time interval.

6. In combination, an alternating current supply circuit, a direct current load circuit, a rotary converter, automatic switching means for connecting said converter to said supply circuit and subsequently to said load circuit, timing means for effecting the disconnection of said converter from said supply circuit if said converter is not connected to said load circuit within a predetermined time interval, and means controlled by the speed of said converter for effecting the disconnection of said converter from said supply circuit independently of said timing means if said converter fails to start within a predetermined time after it is connected to the supply circuit.

7. In combination, an alternating current supply circuit, a direct current load circuit, a rotary converter, automatic switching means for connecting said converter to said supply circuit and subsequently to said load circuit, timing means for effecting the disconnection of said converter from said supply circuit if said converter is not connected to said load circuit within a predetermined time interval, and means responsive to the frequency of the voltage across the direct current end of said converter for effecting the disconnection of said converter from said supply circuit before said timing means can effect the disconnection thereof if said converter fails to reach a predetermined speed within a predetermined time after said converter is connected to the supply circuit.

8. In combination, an alternating current circuit, a rotary converter, means for connecting said converter to said circuit, means including an electroresponsive device for effecting the disconnection of said converter from said circuit, a timing relay for effecting the operation of said electroresponsive device, and a frequency relay responsive to the frequency of the voltage across the direct current end of said converter for effecting the energization of said time relay when the frequency is above a predetermined value and the deenergization of said time relay when the frequency is below a predetermined value.

9. In combination, an alternating current circuit, a rotary converter, means for connecting said converter to said circuit, means including an electroresponsive device for effecting the disconnection of said converter from said circuit, a timing relay for effecting the operation of said electroresponsive device, a frequency relay responsive to the frequency of the voltages across the direct current end of said converter for effecting the completion of an energizing circuit for said time relay, means controlled by said time relay for effecting a holding circuit for itself, and means controlled by said frequency relay for opening the holding circuit of said time relay when the frequency of the voltage across the direct current end of said converter is below a predetermined value.

In witness whereof, I have hereunto set my hand this 9th day of November, 1929.

HAROLD T. SEELEY.